United States Patent [19]

Fischer

[11] Patent Number: 5,344,268
[45] Date of Patent: Sep. 6, 1994

[54] ANCHOR FOR ANCHORING IN A DRILLED HOLE IN CONCRETE VIA A JOINING COMPOSITION

[75] Inventor: Artur Fischer, Tumlingen, Fed. Rep. of Germany

[73] Assignee: fischerwerke Artur Fischer GmbH & Co KG, Tumlingen, Fed. Rep. of Germany

[21] Appl. No.: 14,387

[22] Filed: Feb. 5, 1993

[30] Foreign Application Priority Data

Feb. 13, 1992 [DE] Fed. Rep. of Germany ....... 4204214

[51] Int. Cl.$^5$ .................... F16B 13/06; F16B 39/02
[52] U.S. Cl. ......................... 411/82; 411/55; 411/930; 405/259.5; 405/259.6
[58] Field of Search ............... 411/29, 55, 57, 60, 411/61, 82, 258, 930; 405/259.5, 259.6; 52/698, 704

[56] References Cited

U.S. PATENT DOCUMENTS

| | | | |
|---|---|---|---|
| 2,203,178 | 4/1940 | Pierce . | |
| 2,994,243 | 8/1961 | Langstroth | 411/57 |
| 5,076,733 | 12/1991 | Frease | 405/259.6 X |
| 5,082,399 | 1/1992 | Frease et al. | 405/259.6 |
| 5,176,481 | 1/1993 | Schiefer | 411/55 X |

FOREIGN PATENT DOCUMENTS

| | | |
|---|---|---|
| 0352226 | 1/1990 | European Pat. Off. . |
| 7021545 | 9/1970 | Fed. Rep. of Germany . |
| 2622114 | 1/1977 | Fed. Rep. of Germany . |
| 3238751 | 4/1984 | Fed. Rep. of Germany . |
| 3516866 | 11/1986 | Fed. Rep. of Germany . |
| 3841577 | 6/1990 | Fed. Rep. of Germany . |
| 8807141 | 9/1988 | PCT Int'l Appl. . |

*Primary Examiner*—Neill R. Wilson
*Attorney, Agent, or Firm*—Michael J. Striker

[57] ABSTRACT

The anchor for anchoring in a drilled hole in concrete via a joining composition, includes a threaded bolt consisting of a straight shank portion having an expander cone at one end thereof to be inserted in the drilled hole and a threaded portion at the other end, the expander cone having an outer surface and an end face and widening toward the end face; an expandable sleeve arranged on the threaded bolt enclosing the expander cone and structured to be expanded by the expander cone and a plastic covering on the end face and the outer surface of the expander cone and an adjoining part of the straight shank portion. The complete plastic covering over the expander cone and the adjoining part of the straight shank portion ensures that the joining composition does not bond the expandable sleeve to the threaded bolt, thus hindering subsequent expansion of the expandable sleeve by the expander cone due to crack formation at the drilled hole.

13 Claims, 1 Drawing Sheet

U.S. Patent  Sep. 6, 1994  5,344,268
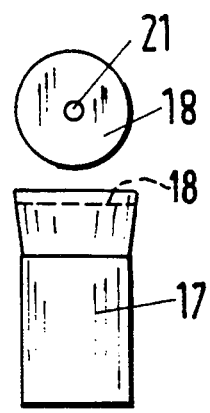
FIG.4
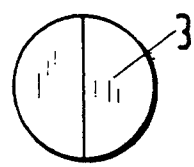
FIG.3
FIG.5
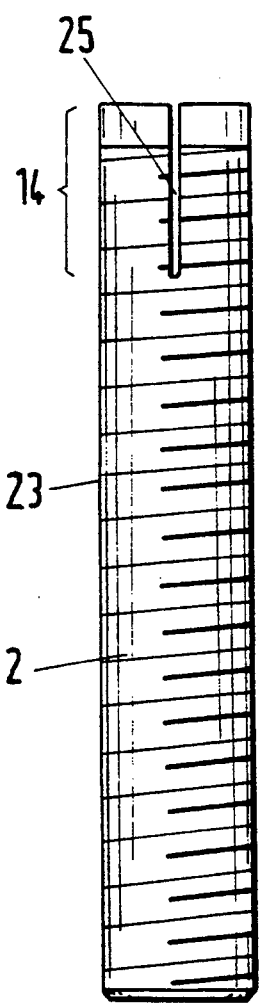
FIG.2
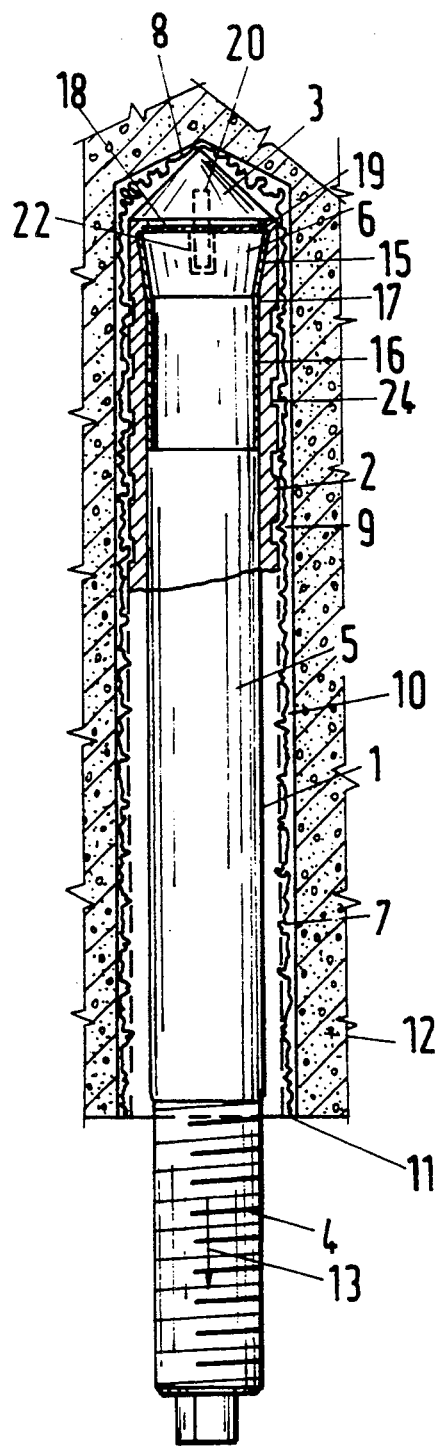
FIG.1

2

ANCHOR FOR ANCHORING IN A DRILLED HOLE IN CONCRETE VIA A JOINING COMPOSITION

BACKGROUND OF THE INVENTION

The invention relates to an anchor for anchoring in a drilled hole in concrete via a joining composition.

An anchor of this type is known comprising a threaded bolt having a threaded portion at one end, an expander cone widening toward its free end at the other end of the threaded bolt inserted in the drilled hole and an expandable sleeve enclosing the expander cone.

To anchor a threaded rod in concrete by a joining composition, a drilled hole is provided in the concrete which has an undercut in the vicinity of its bottom. German Patent Application DE-A1-35 16 866 describes this type of anchor. This known anchor is fixed by a method comprising inserting a glass capsule containing the joining composition into the drilled hole, the joining composition comprising polyester resin, a hardener and additives and crushing the glass capsule with the anchor. The joining composition is activated by mixing its components during and subsequently to the crushing with the anchor. Once the joining composition has hardened the anchor is fixedly bonded and anchored in the drilled hole. The anchorage is based in this instance essentially on the adhesive bond between the joining composition and the wall of the drilled hole. This bond is, however, substantially impaired if a crack is formed running through the anchoring point. By enlargement of the drilled hole as a result of the crack, the joining composition becomes detached from the wall of the drilled hole so that in the straight shank part of the anchor the retention forces are only slight. The known anchor nevertheless has a conical enlargement in the region of the undercut of the drilled hole so that comparatively large retention forces continue to exist there.

The construction of an anchor as a straight anchoring element presents problems because the joining composition becomes detached from the wall of the drilled hole when a crack occurs and thus the retention forces that continue to exist are only slight.

SUMMARY OF THE INVENTION

It is an object of the present invention to provide an anchor for anchoring in a straight drilled hole in concrete via a joining composition, which has a comparatively large margin of safety during exposure to tensile forces in the region subject to tensile forces.

This object and others which will be made more apparent hereinafter are attained in an anchor for anchoring in a straight drilled hole in concrete via a joining composition comprising a threaded bolt having an expander cone at one end thereof to be inserted in a drilled hole in concrete for anchoring, the expander cone widening toward its end face; an expandable sleeve arranged on the threaded bolt enclosing the expander cone and structured to be expanded by the expander cone and a plastic covering on the end face and the outer surface of the expander cone.

According to the invention, a plastic covering is provided on the outer surface and the end face of the expander cone.

The anchor consists of a threaded bolt with an expander cone which is enclosed by an expandable sleeve. To obtain a reliable after-expansion behavior, even with relatively low retention forces (such as those that exist when the crack appears), the threaded bolt is covered in the region of the slotted expandable sleeve with a plastic material. The expander cone and an adjoining portion of a straight shank of the threaded bolt are present in the region of the slotted expandable sleeve. The plastic covering ensures that the joining composition does not cause inseparable adhesive bonds between the expandable sleeve and the threaded bolt. The expander cone cannot be drawn into the expandable sleeve for subsequent expansion, if these inseparable adhesive bonds are formed.

It is especially advantageous for a steel cap or similar construction to be frictionally connected to the threaded bolt so that this connection can be released by an axial relative movement between the steel cap and the threaded bolt. That has the advantage that the steel cap adhesively secured in the drilled hole by the joining composition does not impede an axial movement of the threaded bolt during the subsequent expansion process.

A connecting pin projecting from the steel cap can be provided to form the releasable connection between the threaded bolt and the steel cap by engaging through a throughgoing hole in the plastic covering in the threaded bolt, particularly in a blind hole in the end face of the expander cone. The plastic covering can be in the form of a one-piece plastic coating or comprise a plastic sleeve and a plastic disk located at the end face of the threaded bolt. A crimped-over edge of the expandable sleeve in a preferred embodiment engages over the plastic disk in the edge region thereof and holds it fixed on the end face of the expander cone.

The sleeve of the plastic covering extends over as long a length of the shank of the threaded bolt as possible to allow a bond between the wall of the drilled hole and the expandable sleeve over the entire depth of the drilled hole. The outer surface of the expandable sleeve is provided with a threaded portion or other configuration such as a helical structure to thereby reinforce the adhesive bond between the wall of the drilled hole and the expandable sleeve surrounding the threaded bolt.

BRIEF DESCRIPTION OF THE DRAWING

The objects, features and advantages of the present invention will now be illustrated in more detail by the following detailed description, reference being made to the accompanying drawing in which:

FIG. 1 is a longitudinal cross-sectional view of an anchor according to the invention;

FIG. 2 is a side elevational view of an expandable sleeve of the anchor shown in FIG. 1;

FIG. 3 is a side elevational view of a two-part plastic covering comprising a plastic sleeve and plastic disk for the anchor of FIG. 1, and FIG. 4 is a top view of the part of the plastic cover covering the end face of the expander cone; and FIG. 5 is a plan view of the end-face steel cap of the anchor of FIG. 1.

DETAILED DESCRIPTION OF THE PREFERRED EMBODIMENT

The anchor illustrated in FIG. 1 consists of a threaded rod 1, an expandable sleeve 2 and an end-face steel cap 3. The threaded bolt 1 has a threaded portion 4 on which a screw nut can be screwed to fix an article to the surface of a concrete part. Adjoining the threaded portion 4 there is a straight shank part 5 which is continued as an expander cone 6. The expander cone 6 is located at that the free end of the anchor which is nearest to the bottom 8 of the drilled hole, when the anchor is inserted in the drilled hole 7. As the anchor is inserted into the drilled hole, the steel cap 3 crushes the glass capsule containing the joining composition 9 previously introduced into the drilled hole, the joining composition being displaced during the insertion process so that it is distributed over the entire wall 10 of the drilled hole as far as the mouth 11 of the drilled hole. The drilled hole 7 is a straight drilled hole in a concrete part 12. When a crack occurs in the region of the drilled hole 7, then the retention forces between the expandable sleeve 2 and the wall 10 of the drilled hole are adequate to fix the expandable sleeve in the drilled hole for a subsequent expansion process. The subsequent expansion is effected in that a very slight axial movement of the threaded bolt 1 in the direction of arrow 13 widens the expandable sleeve slightly in its expansion zone 14. An axial displacement of the expander cone 5 presses the conical outer surface 15 in the expansion zone 14 outwards, with the result that the retention forces between the expandable sleeve 2 and the wall 10 of the drilled hole are increased.

The threaded bolt 1 has a plastic covering 16, which consists of a plastic sleeve 17 and a plastic disk 18 mounted on the end face of the expander cone 6, to guarantee that the threaded bolt 1 and the inner surface of the expandable sleeve 2 slide easily over each other in the expansion zone 14. The plastic disk 18 is held on the expander cone 6 by a crimped-over edge 19 of the expandable sleeve 2.

The steel cap 3, which tapers like a wedge, covers the plastic disk 18 and is frictionally connected by a connecting pin 20 to the plastic disk 18. The connecting pin 20 projects axially downwards from the steel cap 3 and is fixed to it. It engages through a throughgoing hole 21 (FIG. 3) in the plastic disk 18 into an axially arranged blind hole 22 in the threaded bolt 1. The diameter of the blind hole 22 is larger than that of the connecting pin 20, while the diameter of the throughgoing hole 21 is slightly smaller than that of the connecting pin 20. The connecting pin 20 is therefore held frictionally in the plastic disk 18, and the steel cap 3 adhesively bonded in the drilled hole 7 by the joining composition does not therefore prevent an axial movement of the threaded bolt 1 in the direction of the arrow 13.

The embodiment of the expandable sleeve 2 illustrated in FIG. 2 is provided with an external thread 23. In the region of the expander cone 6 the expandable sleeve 2 is provided with at least one elongate slot 25 which is open at the end of the expandable sleeve 2 and facilitates expansion of that portion of the expandable sleeve 2. In the embodiment of the expandable sleeve shown in FIG. 1, the circumferential surface 24 of the expandable sleeve 2 has a different structure; it is helical.

The plastic sleeve 17 is shown in FIG. 3 and the plastic disk 18 is shown in FIG. 4. Both parts together form the plastic covering in the region of the threaded bolt 1 which corresponds to the slotted expansion zone 14 of the expandable sleeve 2. It is essential that the plastic covering extend over the entire length of the elongate slot 25 so that also in the vicinity of the elongate slot 25 no joining composition 9 can come into contact with the metallic surface of the threaded rod 1. This reliably prevents adhesion of the metallic expandable sleeve 2 to the metallic threaded bolt 1.

The steel cap 3 is illustrated in FIG. 5 and is shaped like a wedge with a circular base.

While the invention has been illustrated and embodied in an anchor for anchoring in a drilled hole in concrete via a joining composition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Anchor for anchoring in a drilled hole in concrete in which a joining composition is provided to produce an adhesive bond between a wall of the drilled hole and the anchor when the anchor is inserted in the drilled hole during said anchoring, said anchor comprising a threaded bolt consisting of a straight shank portion and an expander cone adjoining said straight shank portion at one end of said threaded bolt to be inserted in a joining composition provided in a drilled hole in concrete for anchoring, said expander cone having an outer surface and an end face and widening toward said end face; an expandable sleeve arranged on the threaded bolt enclosing the expander cone and provided with means for facilitating expansion of said expandable sleeve by the expander cone, and a plastic covering on the end face and the outer surface of the expander cone and on a part of said straight shank portion adjacent to said expander cone so that the joining composition does not form an adhesive bond between the threaded bolt and the expandable sleeve.

2. Anchor as defined in claim 1, further comprising a steel cap in frictional connection with said end of the threaded bolt to be inserted in the drilled hole, said steel cap being axially removable from said end.

3. Anchor as defined in claim 2, wherein said end face of the expander cone is provided with a blind hole, a portion of the plastic covering over the end face of the expander cone is provided with a throughgoing hole in the vicinity of the blind hole and the steel cap has a connecting pin projecting toward the end face of the expander cone through the throughgoing hole in the plastic covering into the blind hole, said throughgoing hole having a smaller diameter than a diameter of the connecting pin.

4. An anchor as defined in claim 2, wherein the steel cap is shaped like a wedge pointing away from the threaded bolt.

5. An anchor as defined in claim 1, wherein the plastic covering consists of a plastic disk covering the end face of the expander bolt and a plastic sleeve surrounding the outer surface of the expander cone.

6. An anchor as defined in claim 5, wherein the expandable sleeve has a crimped-over edge and engages over the plastic disk with the crimped-over edge to hold the plastic disk on the expander cone.

7. An anchor as defined in claim 5, wherein the threaded bolt has a threaded portion at another end thereof remote from said end to be inserted in the drilled hole and the expandable sleeve covers the threaded bolt as far as the threaded portion, said means for facilitating expansion in the expandable sleeve being provided by at least one elongate slot in an end of said expandable sleeve in the vicinity of the expander cone.

8. An anchor as defined in claim 7, wherein the expandable sleeve has an outer surface having a thread.

9. An anchor as defined in claim 7, wherein the expandable sleeve has a helical outer surface.

10. Anchor and hardenable joining composition for anchoring in a drilled hole in concrete, comprising
a hardenable joining composition provided in a drilled hole in concrete; and
an anchor comprising a threaded bolt consisting of a straight shank portion, an expander cone adjoining said straight shank portion at one end of said threaded bolt to be inserted in the joining composition provided in the drilled hole and a threaded portion at an end of said threaded bolt remote from said expander cone, said expander cone having an outer surface and an end face and widening toward said end face; an expandable sleeve arranged on the threaded bolt enclosing the expander cone, extending to said threaded portion over said straight shank portion and provided with means for facilitating expansion of said expandable sleeve by the expander cone when the expander cone is drawn into said expandable sleeve and a plastic covering on the end face and the outer surface of the expander cone and on a part of said straight shank portion adjoining said expander cone so that, when said anchor is inserted in said hardenable joining composition, the joining composition does not form an adhesive bond between the threaded bolt and the expandable sleeve but holds the anchor in the drilled hole after anchoring.

11. Anchor as defined in claim 10, further comprising a steel cap in frictional connection with said end of the threaded bolt to be inserted in the drilled hole, said steel cap being axially removable from said end.

12. Anchor as defined in claim 11, wherein said end face of the expander cone is provided with a blind hole, a portion of the plastic covering over the end face of the expander cone is provided with a throughgoing hole in the vicinity of the blind hole and the steel cap has a connecting pin projecting toward the end face of the expander cone through the throughgoing hole in the plastic covering into the blind hole, said throughgoing hole having a smaller diameter than a diameter of the connecting pin.

13. An anchor as defined in claim 11, wherein the steel cap is shaped like a wedge pointing away from the threaded bolt.

* * * * *